US006153864A

United States Patent [19]

Hammen et al.

[11] Patent Number: 6,153,864

[45] Date of Patent: Nov. 28, 2000

[54] SPRAY WASHABLE AIR COOLED CAP SEALER

[75] Inventors: Richard R Hammen, Menomonee Falls; David C Hamilton, Grafton; Ronald F May, Lannon, all of Wis.

[73] Assignee: Enercon Industries Corporation, Menomonee Falls, Wis.

[21] Appl. No.: 09/408,600

[22] Filed: Sep. 30, 1999

[51] Int. Cl.[7] .............................. H05B 6/14; H05B 6/42; B23B 31/26

[52] U.S. Cl. .......................... 219/632; 219/633; 219/661; 219/677; 156/69; 156/380.2; 53/477; 53/DIG. 2; 439/271

[58] Field of Search .................................... 219/633, 632, 219/660, 661, 677; 156/69, 272.4, 274.2, 380.2; 53/DIG. 2, 477; 439/271, 374, 378, 380

[56] References Cited

U.S. PATENT DOCUMENTS

| | | | |
|---|---|---|---|
| D. 398,314 | 9/1998 | Herzog | D15/146 |
| 2,954,453 | 9/1960 | Reboux | 219/660 |
| 4,095,390 | 6/1978 | Knudsen | 53/39 |
| 4,323,748 | 4/1982 | Likins | 219/660 |
| 4,355,222 | 10/1982 | Geithman et al. | 219/633 |
| 4,707,213 | 11/1987 | Mohr et al. | 156/380.2 |
| 4,936,943 | 6/1990 | Kubis et al. | 156/580 |
| 5,032,699 | 7/1991 | Hu | 219/624 |
| 5,281,174 | 1/1994 | Bonner | 439/825 |
| 5,329,101 | 7/1994 | Ellis | 219/632 |
| 5,418,811 | 5/1995 | Ruffini et al. | 373/152 |
| 5,588,019 | 12/1996 | Ruffini et al. | 373/152 |

FOREIGN PATENT DOCUMENTS

| | | | |
|---|---|---|---|
| 0842854A2 | 5/1998 | European Pat. Off. | B65B 51/22 |

OTHER PUBLICATIONS

Applicant's Exhibit A, "New portable 'waterless' cap sealer," one–page product brochure, Pillar Technologies, undated, admitted prior art.

Applicant's Exhibit B, "The Facts About Induction Sealing," two–page brochure of Enercon Industries Corp., Menomonee Falls, WI, undated, admitted prior art.

Applicant's Exhibit C, "Enercon Induction Sealing System: Integral II," two–page brochure of Enercon Industries Corp., Menomonee Falls, WI, undated, admitted prior art.

Applicant's Exhibit D, "Auto Jr.," one–page brochure of Enercon Industries Corp., Menomonee Falls, WI, undated, admitted prior art.

Applicant's Exhibit E, "Compak Jr.," two–page brochure of Enercon Industries Corp., Menomonee Falls, WI, undated, admitted prior art.

Applicant's Exhibit F, "Enercon Induction Sealing System: Compak" two–page brochure of Enercon Industries Corp., Menomonee Falls, WI, undated, admitted prior art.

Applicant's Exhibit G, "Enercon Industries: A Company Profile," two–page brochure of Enercon Industries Corp., Menomonee Falls, WI, undated, admitted prior art.

Applicant's Exhibit H, "Enercon Cap Inspection System," two–page brochure of Enercon Industries Corp., Menomonee Falls, WI, undated, admitted prior art.

Applicant's Exhibit I, "Tamper Evident," two–page brochure of Enercon Industries Corp., Monomonee Falls, WI, undated, admitted prior art.

(List continued on next page.)

*Primary Examiner*—Philip H. Leung

*Attorney, Agent, or Firm*—Quarles & Brady LLP

[57] ABSTRACT

A cap sealing unit for securing foil-polymer laminate innerseals to containers has an air cooled electronics cabinet that may be sealed in accordance with NEMA 4 standards. Heat sinks in the bottom of the electronics cabinet and the top of the sealing head are cooled by two external, washdown safe fans disposed between the cabinet and the sealing head. The fans draw air in opposite directions, one toward the cabinet and the other toward the sealing head. The cap sealer can be operated with interchangeable flat or tunnel sealing heads of various sizes and coil windings that can be connected to the power supply with plug-in shielded connector assemblies.

27 Claims, 8 Drawing Sheets

OTHER PUBLICATIONS

Unraveling the Myths and Mysteries of Induction Sealing, William F. Zito; reprinted from Journal of Packaging Technology, Jan. 1990.

Heat–Sealer Adds Flexibility to Glaxo, reprinted from Pharmaceutical & Medical Packaging News, Nov. 1995.

Quality from the Inside Out, reprinted from Dairy Foods, May 1992.

Meguiar's moves to inner seals, reprinted from Good Packaging Magazine, Nov. 1995.

An unconventional seal, reprinted from Packaging World, Feb. 1997.

Acadiana seals its sauce, reprinted from Packaging Digest, Apr. 1989.

Mixed pallet program is oiled by quick turnover of lubricant bottling, reprinted from Packaging Digest, Sep. 1995.

SPRAY WASHABLE AIR COOLED CAP SEALER

BACKGROUND OF THE INVENTION

1. Field of the Invention

The invention relates to the field of heat sealing caps to containers. In particular, the invention is an air cooled inductive sealing apparatus in which the power supply and electronics are enclosed so that the apparatus may be spray washed, in accordance with NEMA 4 standards.

2. Discussion of the Prior Art

For some time, the food industry has been hermetically sealing the openings of containers to retain freshness of food and to prevent contamination from microorganisms or other bacteria. Similarly, drug manufacturers have been sealing bottles with seals that cannot be unnoticeably removed in an effort to prevent tampering with the contents. Beyond the food and drug industry, manufacturers of liquids or air sensitive products also tightly seal their product containers to prevent leakage and prolong shelf life.

One method to obtain such seals is inductive sealing. Inductive sealing requires an electromagnetic-field-producing apparatus and a foil-polymer seal. Typically, the apparatus includes at least one coil of wire wound to produce an electromagnetic field when electric current is supplied to the coil. It is well known in the art that electromagnetic fields induce eddy currents within metal which in turn heat the metal. The seal comprises a thin layer of aluminum foil onto which is laminated a polymer layer that is molecularly compatible with the container to be sealed. When the seal is placed onto the container and the container is placed within the electromagnetic field, the foil is heated which melts the layer of polymer. Removing the seal from the electromagnetic field allows the polymer to cool and molecularly fuse with the container to create an air-tight seal.

Industrial settings, the primary environment for induction sealers, typically have strict cleanliness requirements, particularly in the heavily regulated food and drug industries. To comply with these regulations, manufacturers are typically required to wash down the production area with water and/or a disinfectant. Thus, the power supply circuitry of induction sealers must be enclosed in accordance with the National Electrical Manufacturers Association (NEMA) standard 4, i.e., a completely sealed enclosure that is suitable for wash-down.

As is known by those skilled in the art, however, the strength of the electromagnetic field chiefly depends upon the number of turns in the wire coils and the amount of current supplied to the coils. To produce an electromagnetic field adequate for commercial inductive sealing, typically the power supply must output power in the order of a few kilowatts, which produces a great deal of heat. Thus, the power supply must be cooled in order to function properly.

Many methods of cooling are known in the art, in particular, it is known to vent and/or force air through the power supply. Venting the power supply cabinet in any way, however, precludes the sealing needed to maintain NEMA 4 standards. It is also known to remove heat by circulating cool water through pipes or tubes running through the enclosure containing the power supply. Water cooling, however, requires complicated piping configurations that increase the size and cost of the sealing apparatus. An air cooled inductive sealing apparatus is needed, therefore, that has a power supply and electronic circuitry enclosed in a NEMA 4 cabinet.

SUMMARY OF THE INVENTION

The present invention is an apparatus for inductively sealing a foil-polymer laminate innerseal over an opening in a container. The apparatus includes a cabinet containing a power supply. The cabinet has a cover removably connected to a baseplate heat sink and sealed so that it may be spray washed (i.e., sealed to NEMA 4 standards). The apparatus also includes an external sealing head mounted to the enclosure producing an electromagnetic field. The electromagnetic field heats innerseals placed beneath caps secured over openings in the container. The heated foil in the innerseals melts the polymer laminate, and upon resolidification, fuses to the containers and hermetically seals the openings. At least one external fan is disposed between the sealing head and the cabinet for moving cooling air over the power supply base plate heat sink and the sealing head.

An object and advantage of the invention is that the power supply and electronic circuitry may be sealed within the cabinet according to NEMA 4 standards without overheating. The cabinet base plate heat sink is in thermal contact with the major heat producing elements within the cabinet and the external (wash-down safe) fan moves air past the heat sink. This permits the inside of the enclosure to be cooled without venting the enclosure to the surrounding space.

Another object and advantage of the invention is that sealing heads of different sizes and configurations may be used. The sealing head includes a heat sink which forms the top wall of a housing that contains a wire coil proximate an electromagnetic field focusing material disposed within the housing. The sealing head may take the form of a tunnel on the lower, sealing side of the housing through which the container tops pass when being sealed. Or, the sealing head may take the form of a housing having a flat surface on the lower, sealing side.

Another object and advantage of the invention is that the sealing head is removably mounted to the cabinet by an adjustable mounting bracket, and plug-in shielded connector assemblies facilitate the interchange of various sealing heads. The connector assemblies electrically connect the power supply to the coil in the sealing head at a surface connection wherein the engagement is adjustable to allow the sealing head to be raised or lowered. In one embodiment, three shielded connector assemblies are electrically connected to the power supply, one to a common wire and the other two to different capacitive elements. In this way, the coil(s) of one sealing head can be electrically connected at two connector assemblies to operate at a relatively low frequency, and another sealing head coil(s) can be electrically connected to another two connector assemblies to operate at a relatively higher frequency. Thus, the frequency of the electromagnetic field can be easily varied.

The foregoing and other objects and advantages of the invention will appear from the following description. In this description reference is made to the accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENTS

Figure 1:
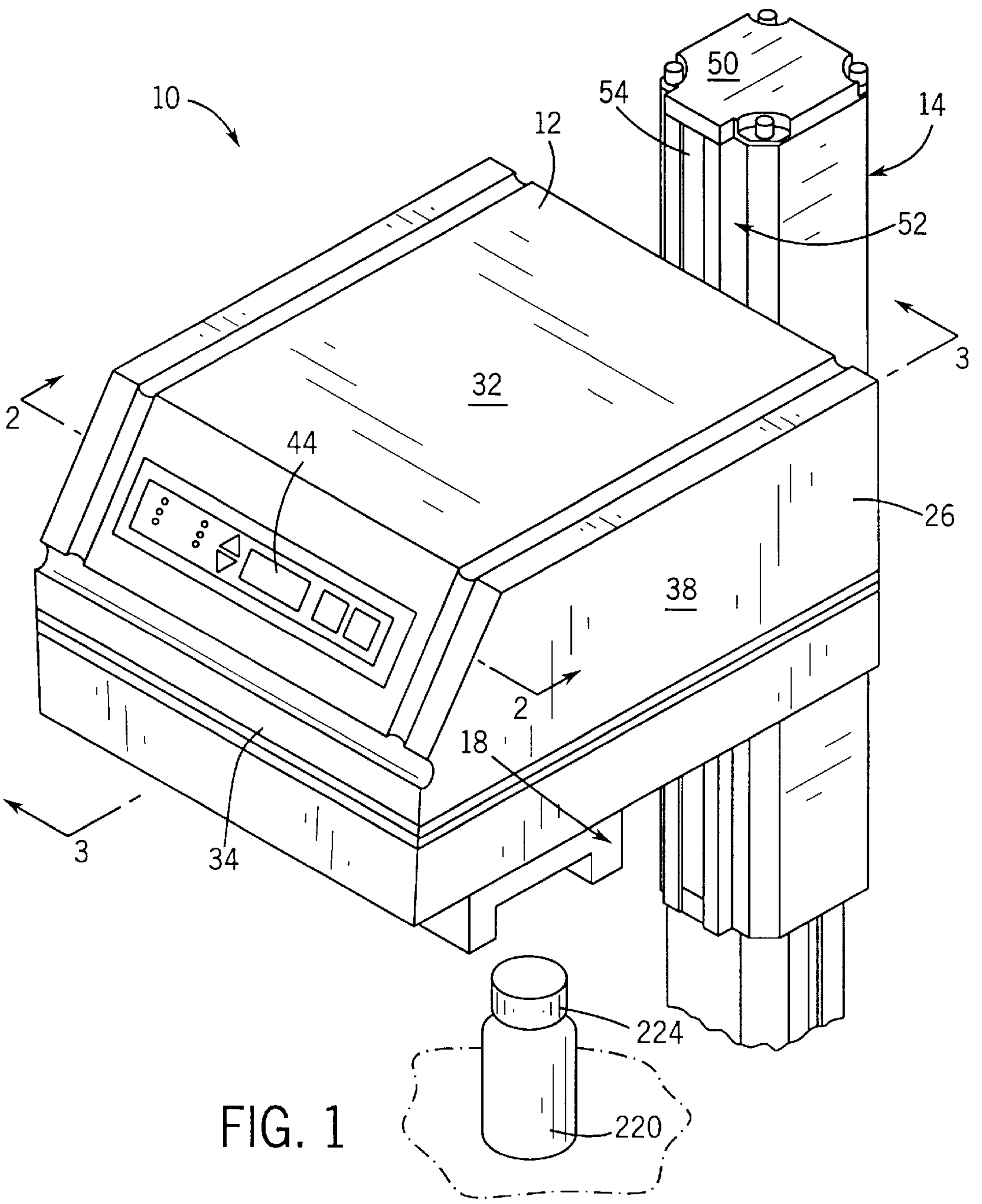
FIG. 1 is a perspective view of the air cooled cap sealer of the present invention with the tunnel sealing head configuration and showing a container for sealing.
Figure 2:
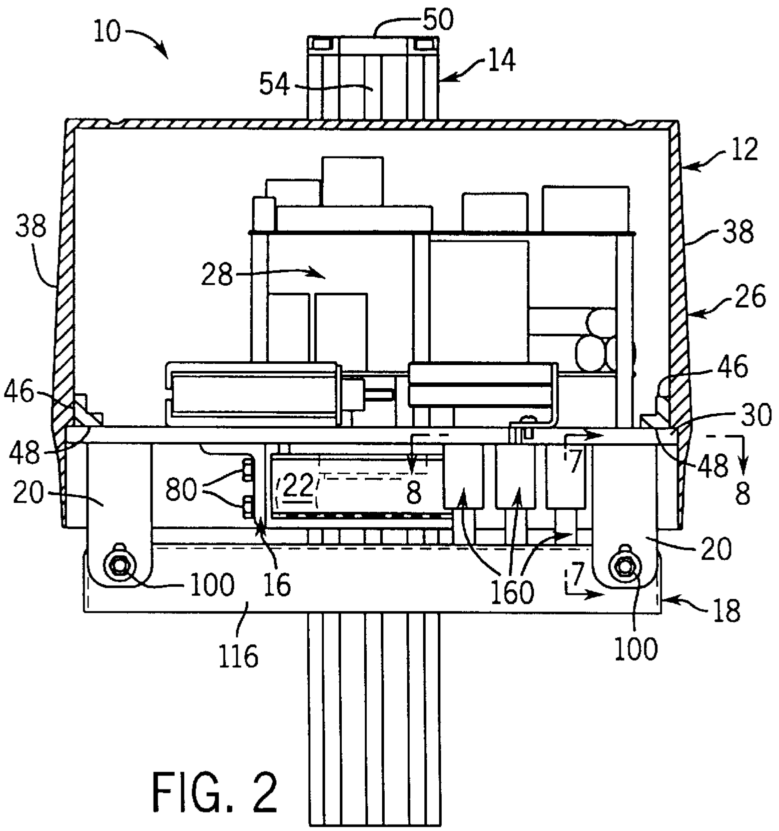
FIG. 2 is a front partial cross-sectional view taken along line 2-2—2-2 of the cap sealer of FIG. 1 with the flat sealing head configuration.
Figure 3:
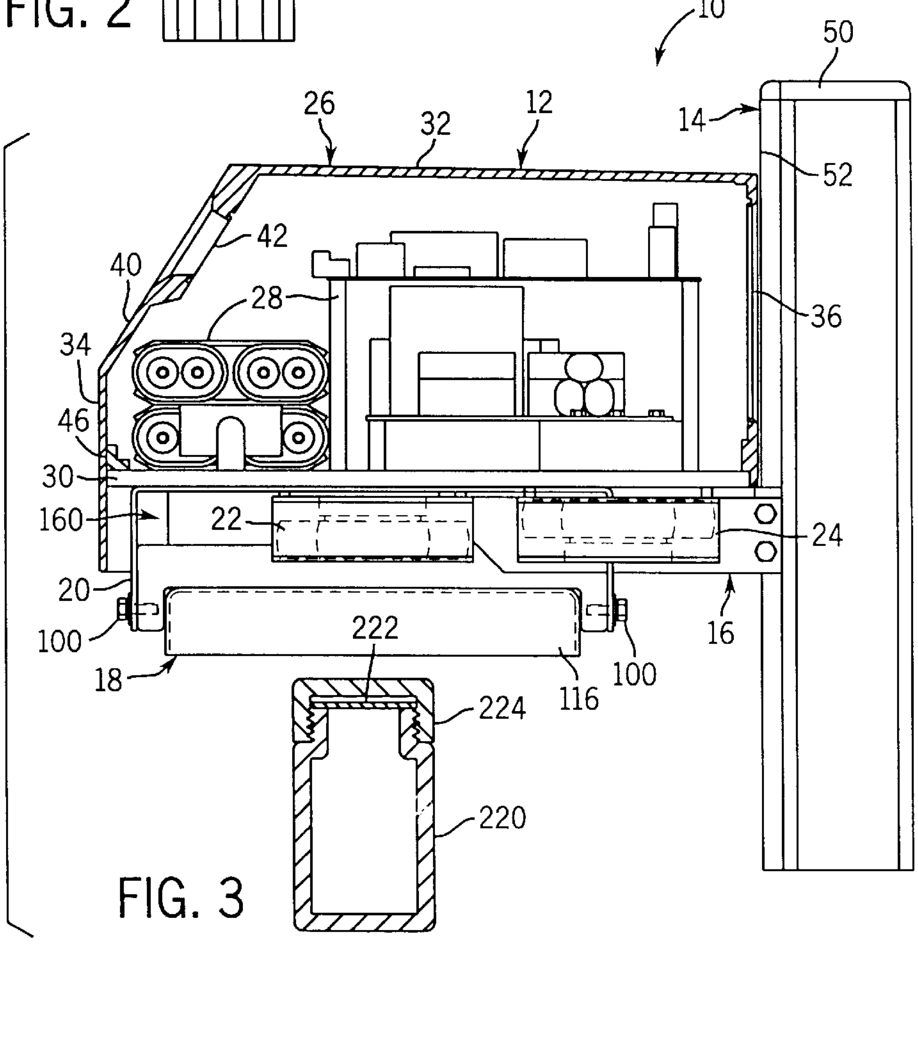
FIG. 3 is a side partial cross-sectional view taken along line 3-3—3-3 of the cap sealer of FIG. 1 with the flat sealing head configuration and showing a container for sealing in cross-section.

The air cooled cap sealer of the present invention is illustrated in the many views of the figures and is generally indicated by reference number 10 in FIG. 1. Referring to FIGS. 1–3, the power supply cabinet 12 is slidably cantilevered to a support post 14 by cabinet mounting bracket 16. A sealing head 18 is secured beneath the cabinet 12 by head mounting brackets 20. The cabinet mounting bracket 16 defines a space between the cabinet 12 and the sealing head 18, and two fans 22 and 24 are mounted in this space. As will be described in more detail below, one of the fans directs air upward against the lower surface of the cabinet 12 and the other fan directs air downward against the top surface of the sealing head 18.

The cabinet 12 comprises a cover 26, power supply electronics 28 and a base plate 30. The cover 26 is constructed from a suitable material, such as stainless steel, and has a top wall 32, front wall 34, back wall 36 and two side walls 38. Referring particularly to FIG. 3, the front wall 34 includes an angled surface 40 with an opening 42 for a control panel 44. Angles 46 are suitably secured to an interior surface of the front 34 and side 38 walls. The angles 46 provide a ledge 48 for resting the cover 26 on the base plate 30. Referring again to FIGS. 1–3, the bottom edges of the front 34, back 36 and side 38 walls extend downward below the base plate 30 so as to create a skirt around the fans 22 and 24 when assembled. The base plate 30 is a substantially square aluminum plate approximately ⅜" thick. The aluminum base plate 30 is in thermal contact with heat-producing elements of the power supply and acts as a sink for the generated heat within the cover 26.

Figure 4:
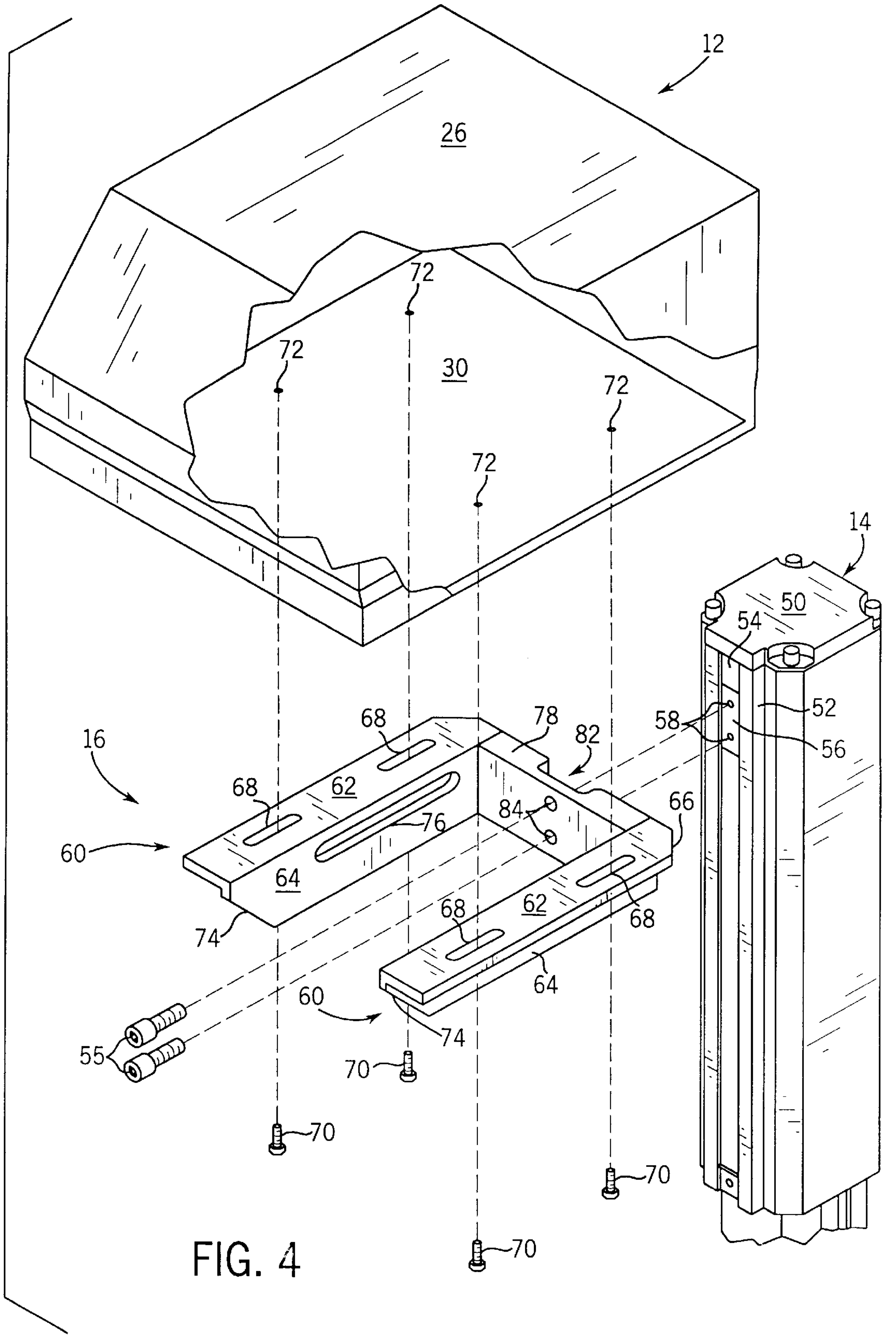
FIG. 4 is a cut-away assembly view of the cap sealer of FIG. 1, showing the assembly of the mounting bracket to the heat sink plate and the support post.

Referring to FIG. 4, as stated, the cabinet 12 is mounted to the support post 14 by mounting bracket 16. The transverse post 14 is a tubular member having a cross-section with a substantially square outer perimeter and a geometric inner perimeter covered at the top by a cap 50. The post 14 has a projecting track portion 52 defining a channel 54 in which is captured a slidable, rectangular nut 56 with threaded bores 58.

Referring to FIGS. 3–4, the metal cabinet mounting bracket 16 is made of two lateral members 60 having an L-shaped cross-section defined by a longitudinal first leg 62 and a transverse second leg 64. The first leg 62 has a tapered rear end 66 and two lateral slots 68 for adjustably mounting the bracket 16 to the plate 30 by fasteners 70 in threaded bores 72. The second leg 64 has a tapered front end 74 and a lateral slot 76 of increased length disposed proximate the union of the first 62 and second 64 legs. The lateral members 60 are joined by a longitudinal cross-bar 78 connected at the rear end of the second legs 64 by fasteners 80. The cross-bar 78 has a central transverse channel 82, sized to fit over the track portion 52 of the support post 14, with two counter-sunk bores 84, transversely spaced apart the same distance as the threaded bores 58 in the slidable nut 56. The cabinet 12 is adjustably mounted to the support post 14 by inserting fasteners 55 through the bores 84 in the mounting bracket 16 and threading them through the nut 56. The nut 56 and cabinet 12 are secured at a transverse position by tightening the fasteners 55 into contact with the post 14.

Figure 5:
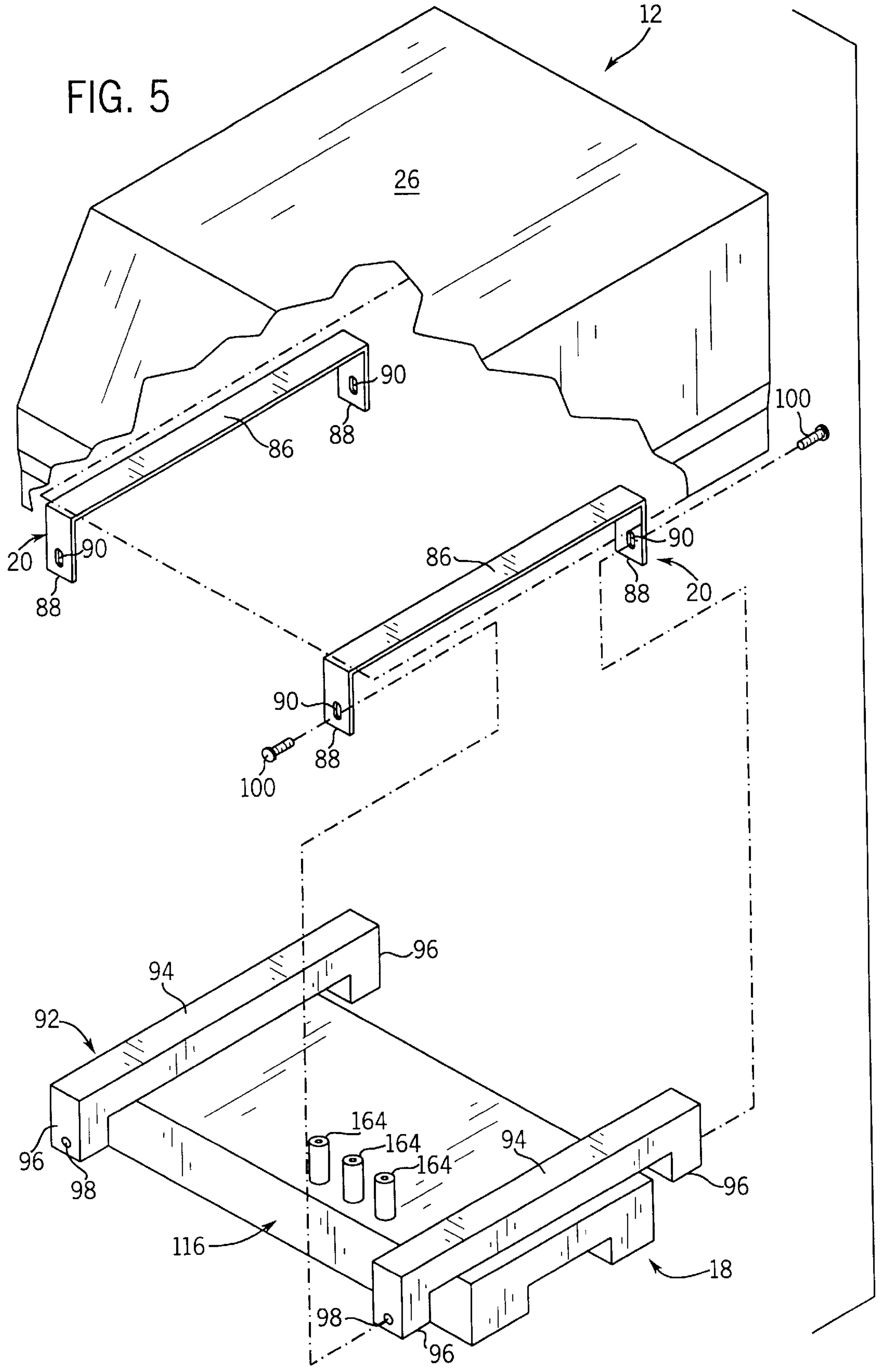
FIG. 5 is a cut-away assembly view of the cap sealer of FIG. 1, showing the assembly of the tunnel sealing head.

As shown in FIGS. 2, 3 and 5, the sealing head 18 is fastened to the base plate 30 by the head mounting brackets 20. The head mounting brackets 20 are preferably metal, having a generally inverted U-shaped lateral cross-section with a lateral cross-bar portion 86 and transverse ends 88, each of which contain a transverse slot 90. The cross-bar portion 86 contains bores (not shown) for securing the mounting brackets 20 to the base plate 30. Each mounting bracket 20 is sized to receive a phenolic insulator 92 sized to nest within the mounting bracket 20 and having a U-shape with a lateral leg 94 and two transverse ends 96. The transverse ends 96 contain through bores 98 that, when assembled, align with the slots 90 in the mounting brackets 20, so that the insulators 92 can be secured to the bracket 20 by threaded fasteners 100. The lateral leg 94 has two counter-sunk bores (not shown) for mounting the sealing head 18 at cylindrical inserts 102 (see FIGS. 6A–6B).

Referring again to FIGS. 2–3, the fans 22, 24 are wash-down safe fans such as those commercially available from EBM Industries, Inc, located in Farmington, Conn. The fans 22, 24 are fastened to the base plate 30 and are spaced laterally one behind the other at the longitudinal center of the plate 30. As a result, the rear fan 24 is surrounded on three sides by the cabinet mounting bracket 16. The slots 76 in the transverse legs 64 of the bracket 16 provide a side air stream to the rear fan 24. The front fan 22 is oriented to draw air downward away from the cabinet 12 and the rear fan 24 is oriented to draw air upward away from the sealing head 18. This configuration allows the fans 22, 24 to direct air past and away from the cabinet 12 and the sealing head 18 so as to cool the power supply electronics 28 and the head 18 according to the principles of convective heat transfer, as is known to those skilled in the art.

Referring to FIGS. 2, 3, 6A and 6B, the cap sealer 10 may be interchangeably operated with a flat sealing head, as shown in FIG. 3, particularly suitable for wide necked containers or with a tunnel sealing head, as shown in FIG. 1, suited for narrow, bottle-necked containers. Either way, the sealing head 18 comprises a housing 116, an aluminum heat sink plate 118, and wire 150 wound into one or more coils 152. The housing 16 is preferably made of an ABS plastic material and comprises a tray 124 and a bottom cover 126 (see FIG. 9). The tray 124 has a generally rectangular opening 128 into which fits the heat sink plate 118 suitably secured to the housing 116. The bottom cover 126 is fastened to the tray 124 at bores 135 in lateral 136 and longitudinal 137 fiberglass blocks adhered to the interior surface of the tray 124.

Figure 6A:
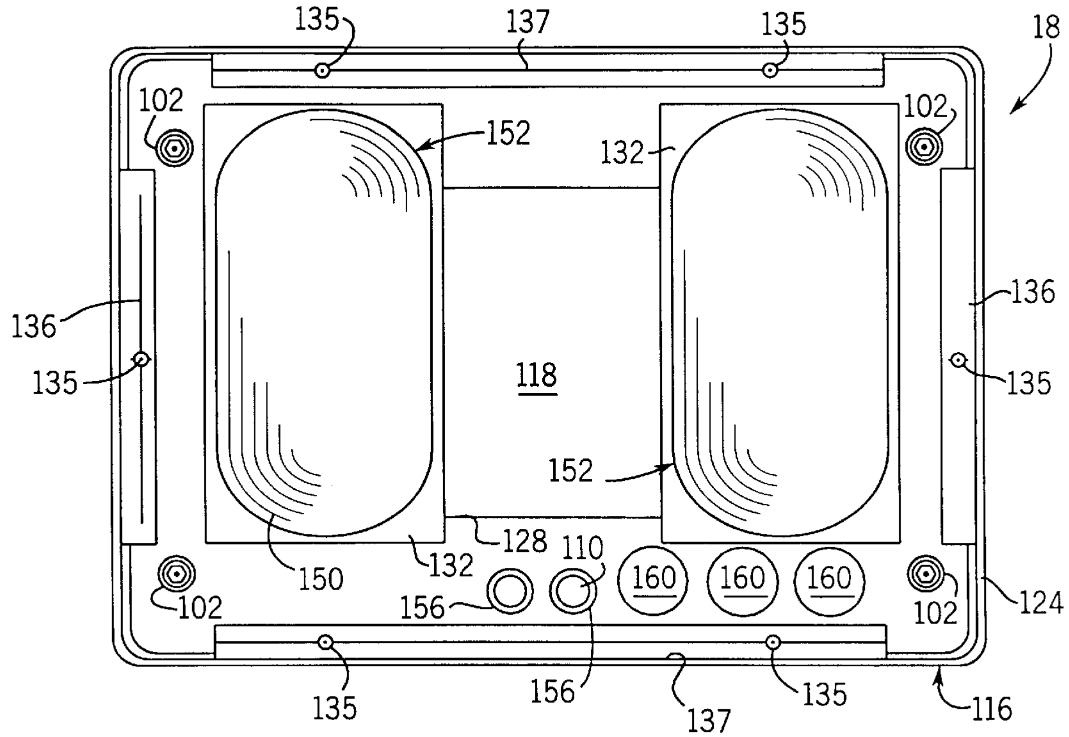
FIG. 6A is a bottom planar view of a sealing head of the cap sealer of FIG. 1 having two laterally wound coils, shown without the cover of the housing.
Figure 6B:
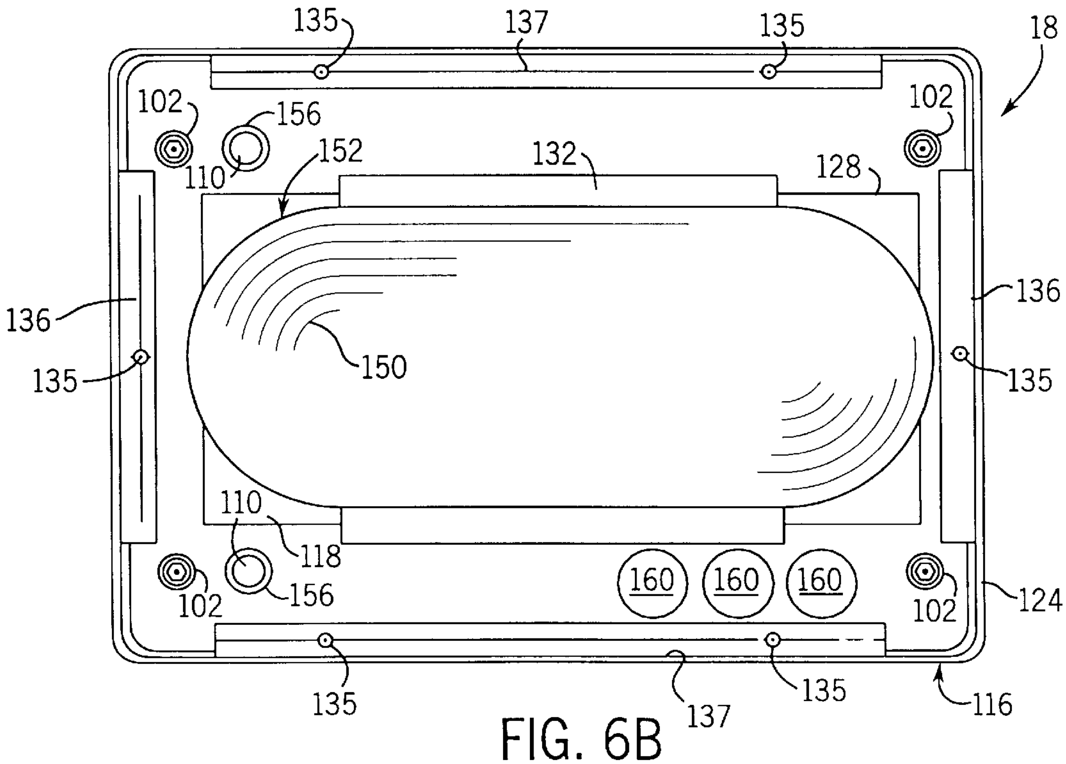
FIG. 6B is a bottom planar view of a sealing head of the cap sealer of FIG. 1 having one longitudinally wound coil, shown without the cover of the housing.

The sealing head 18 may have two induction coils 152 as shown in FIG. 6A. Or, the sealing head may have a single, longitudinally wound coil 152, as shown in FIG. 6B. Either way, the coil(s) are suitably formed of wound wire 150, as known in the art, and mounted to the plate 118 by a suitable fastener or adhesive (not shown). Preferably, each coil 152 is disposed proximate an electromagnetic field focusing element 132, formed of a ferromagnetic compound having ferric oxide, so that, rather than radiating omni-directionally, the electromagnetic field produced by the coils is directed downward toward the containers 220.

The positive and negative ends of the coil(s) 152 are inserted through rubber grommets 156 disposed in bores in the housing 116. The ends of the coil(s) are connected to two shielded connector assemblies 160, described in detail below, by bus wires (not shown). The bottom cover 126 is fastened to the housing tray 124, and the sealing head 18 is mounted to the insulators 92 (see FIG. 5) by fasteners 158 that are received in the threaded inserts 102 located at each corner of the tray 124.

Referring to FIGS. 5, 6A and 6B, the number and size of coils 152 can be varied according to the sealing requirements. The lateral dimension of the sealing heads are the same. Thus, the location of the inserts 102 and the bores (not shown) in the insulators 92 are uniformly set so that each head can be interchangeably mounted to the cabinet 12. The sealing heads 18 are interchanged by first loosening the fasteners 100 so that the insulators 92 and head 18 can be removed from the sealing head mounting brackets 20. Then, the head 18 is removed from the insulators by loosening the fasteners (not shown) in the insulator legs 94. The sealing head 18 is then unplugged from the cabinet at the shielded connector assemblies 160 by pulling downward. The heads 18 can be swapped by reversing this process and re-tightening the fasteners.

Figure 7:
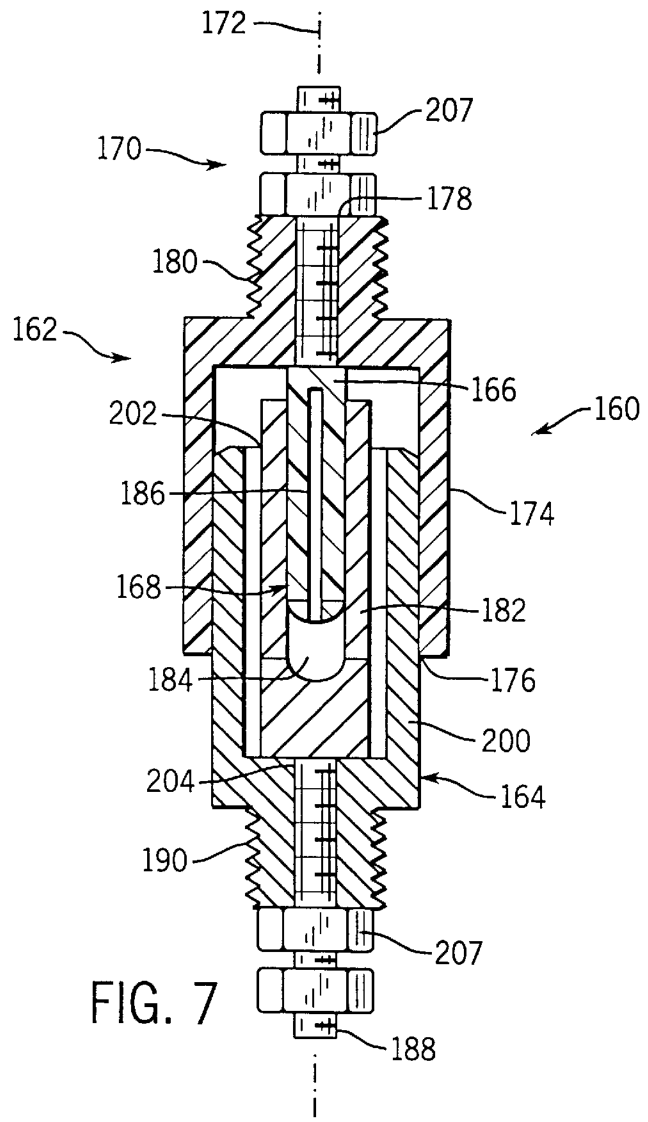
FIG. 7 is an enlarged cross-sectional view taken along line 7—7 of FIG. 2 of one of the preferred shielded connector assemblies.

Referring now to FIG. 7, in a preferred embodiment, each shielded connector assembly 160 is comprised of a terminal half 162 and a receptor half 164. The terminal half 162 includes a cylindrical terminal post 166 made of a suitable electrically conducting material terminating at a connection end 168 and an opposing threaded end 170 extending along a terminal axis 172. An annular terminal shroud 174 concentrically surrounds the terminal post 166 and has an opening 176 proximate the connection end 168 of the terminal post 166 and an elongated aperture 178 of decreased diameter at the opposing end 170. The terminal shroud 174 also includes a threaded stud portion 180 concentric with and adjacent to the smaller, elongated aperturel 78.

The receptor half 164 includes a terminal receptor 182 made of a suitable electrically conducting material and extending along the terminal axis 172. The terminal receptor 182 defines an elongated cavity 184 opening to the connection end 168 of the terminal post 166 and having a diameter slightly larger than the terminal post 166 so as to make surface contact with the post 166 when it is engaged in the receptor 182. The connection end 168 of the post 166 includes a lengthwise slit 186 permitting inward compression of the post 166 as and while it is inserted in the receptor cavity 184. The cavity 184 is slightly longer than the connection end 168 of the terminal post 166 to allow for varied transverse engagement of the connector assemblies 160 so that the sealing head 18 may be adjusted to a desired height. The terminal receptor 182 has a threaded end 188 of lesser diameter similar to that of the terminal post 166. An annular receptor shroud 200 concentrically surrounds the terminal receptor 182 having one opening 202 at the connection end 168 and a threaded stud 190 opposite the connection end 168. An elongated aperture 204 concentric with the threaded stud 190 receives the threaded end 188 of the terminal receptor 182. In a preferred embodiment, the receptor shroud 200 is sized to fit with terminal shroud 174. The invention is not limited in this regard, however, as the terminal shroud 174 may be sized to fit within the receptor shroud 200. Both the terminal 174 and receptor 200 shrouds are preferably made of an electrically non-conductive material, such as a suitable plastic.

Figure 8:
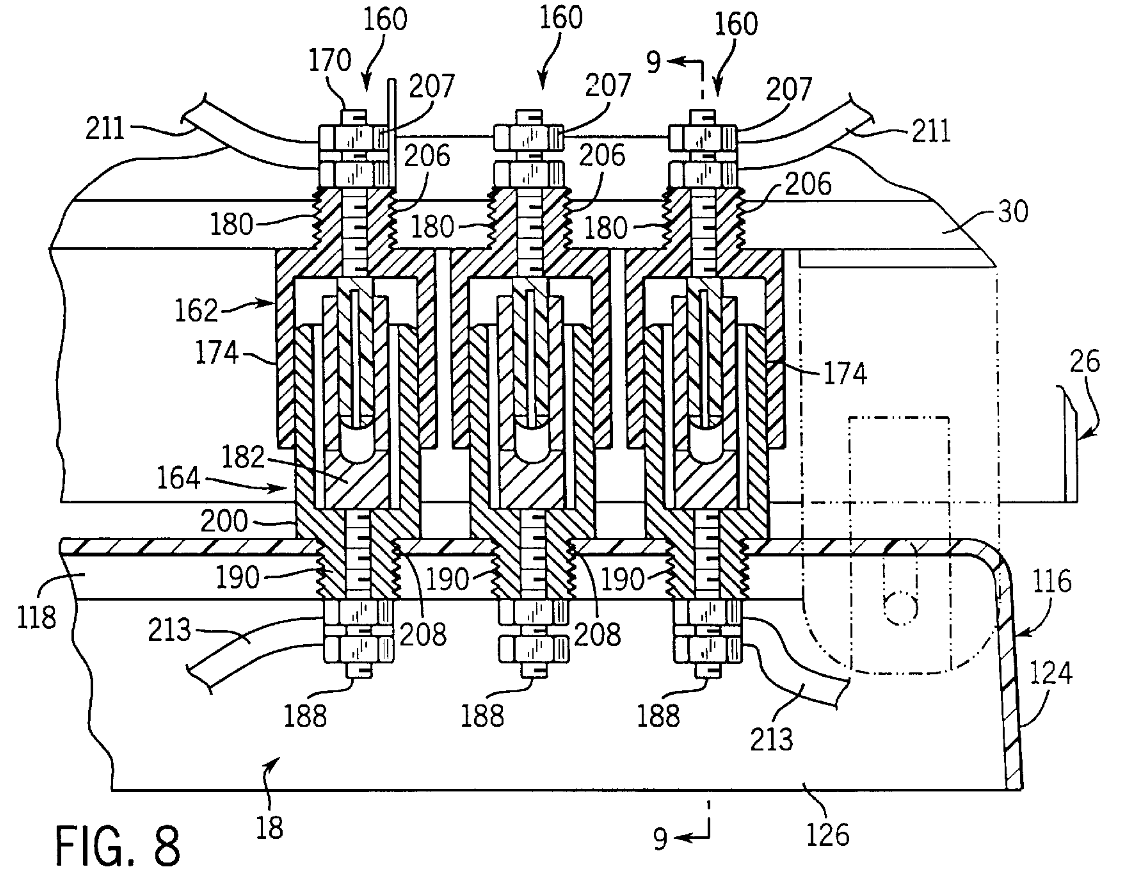
FIG. 8 is a cut-away cross-sectional view taken along line 8—8 of FIG. 2 of the cap sealer of FIG. 1, showing a preferred embodiment of shielded connector assemblies.
Figure 9:
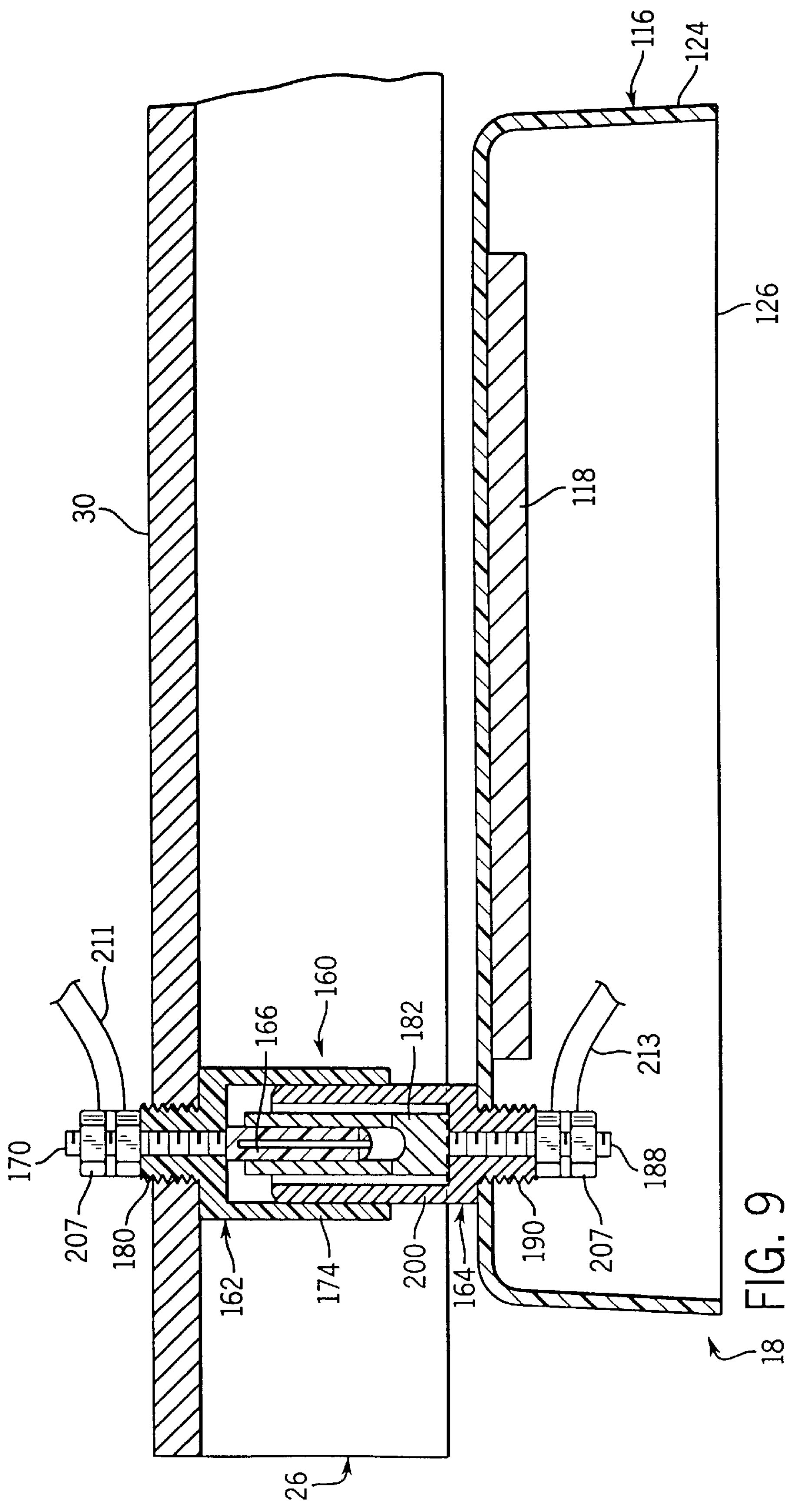
FIG. 9 is a cut-away cross-sectional view taken along line 9—9 of FIG. 8 of the cap sealer of FIG. 1 without the head mounting bracket insulator and showing the shielded connector assemblies.

Referring now to FIGS. 8 & 9, in the preferred embodiment, the terminal half 162 of each shielded connector assembly 134 is fixed to the cabinet base 30 and the receptor half 164 is fixed to the housing 116 of the sealing head 18. The stud ends 180 of the terminal halves thread into threaded bores 206 in the base 30. Two nuts 207 inside the cover are threaded on to the threaded end 170 of each terminal post 166 for securing the post 166 to the base 30 as well as attaching power supply bus wires 211. Similarly, the stud ends 190 of the receptor shroud 200 threads into bores 208 in the sealing head housing 116. As with the terminal half 162, two nuts 207 inside are threaded on to the threaded end 188 of each terminal receptor 182 for attaching coil bus wires 213.

The arrangement of the connector assemblies 160 permits adjustment of the height of the sealing head 18 without disconnecting it from the power supply bus wires 211or the cabinet 12. Since the connector halves 162, 164 plug into each other without the need for additional fastening, changing to a sealing head having a different size or configuration is easy.

The described configuration of the shielded connector assemblies 160 is preferred because in the preferred embodiment the terminal shroud 174 has a greater diameter than the receptor shroud 200 and this configuration orients the opening in the terminal shroud 174 downwardly, thus reducing the likelihood that moisture or other foreign bodies could contact the terminal post and/or receptors. As a result, the connector assemblies 160 comply with NEMA 4 standards and may be safely spray washed. Alternatively, a gasket or sealing ring (not shown) may be disposed in a circumferential groove (not shown) near the opening on the inside of the larger diameter shroud 174, 200 or the outside of the small diameter shroud 200, 174 to further seal the connector assemblies 160. Thus, in either shroud configuration, the sealer 10 is wash-down safe according to NEMA 4 standards.

Figure 10:
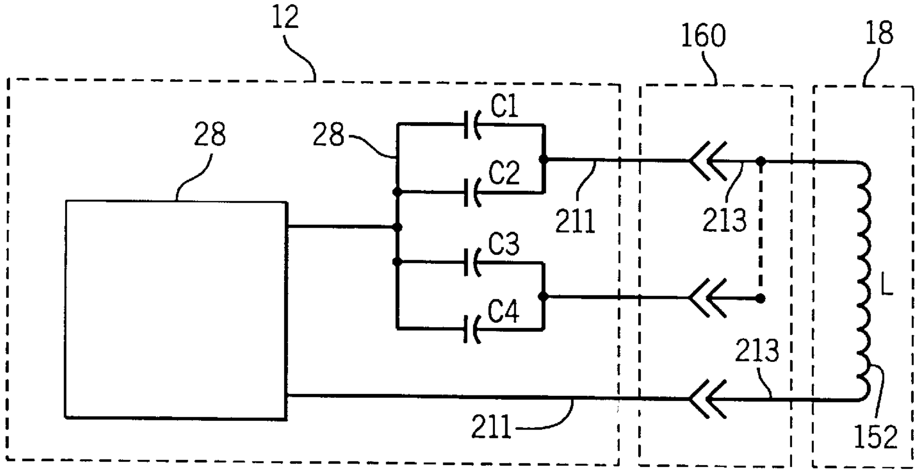
FIG. 10 is a schematic diagram of the cap sealer of FIG. 1 showing alternate frequency connections of the sealing head coil(s).

In the preferred embodiment, three shielded connector assemblies 160 are used to electrically connect the cabinet power supply 12 to the sealing head coil(s) 152. Referring to FIG. 10, in a preferred embodiment, the terminal halves 162 of all three connector assemblies 160 are electrically coupled to the power supply 28 electronics by the power supply bus wires 211, while only two of three receptor halves are connected to a sealing head coil 152 by the coil bus wires 213. Even though only two of the three connector assemblies 160 make an electrical connection, all three are physically coupled together. The terminal half 162 of one connector assembly 160 is coupled to a common or negative power supply bus wire 211. The terminal halves 162 of the other two connector assemblies 160 are coupled to different capacitive element(s) of the power supply 28 using by a positive bus wire 211, for example C1 and C2 or C1–C4. In this way, a sealing head 18 may be plugged into the power supply 28 to operate at one frequency (when connected to C1 and C2 only) and another sealing head 18 may be operated at another, higher or lower, frequency (when connected to C1–C2). Thus, the sealing heads 18 can be easily interchanged to provide more or less electromagnetic field as desired, and still operate at a frequency optimal for the coil(s).

The above describes one embodiment of the connector assemblies, however, the invention is not limited to this embodiment. For example, the terminal post 166 need not be cylindrical, but instead may be a flat rectangular member or other such configuration, and the receptor 182 being shaped accordingly. Similarly, as mentioned, the terminal 174 or receptor 200 shrouds may include a circumferential groove proximate the openings at the connection end 168 for retaining a sealing ring (not shown), such as a conventional o-ring, so as to hermetically seal the terminal 162 and receptor 164 halves, and provide increased waterproofing.

Again referring to FIGS. 1& 3, the air cooled cap sealer 10 of the present invention is operated similarly for either the flat or the tunnel shaped sealing head. The cap sealer 10 is operated by loosening the fasteners 55 and adjusting the transverse position of the head 18 according to the appropriate height of a container 220 to be sealed, and then refastening the fasteners 55. The opening of the container 220 is then covered with an innerseal 222 having a polymer layer laminated to an aluminum foil layer. A cap 224 is snapped, screwed or otherwise fit onto the lip of the container 220, which places a downward force on the innerseal 222. The container 220 is then placed upright with the cap 224 under the sealing head 18. Applying power to the coil(s) 152 produces an electromagnetic field directed downwardly from the sealing head 18 for a prescribed period of time which heats the foil layer and melts the polymer layer. The container 220 is removed from beneath the sealing head 18 which allows the polymer layer to cool and fuse to the container at the circumference.

The apparatus may be operated as described above by manually placing one container 220 at a time beneath the sealing head 18. Or, it may be utilized in large scale assembly lines with the one or more containers 220 continuously or intermittently passing through the electromagnetic field under the sealing head 18 on a conveyor belt or similar assembly line.

Illustrative embodiments of the invention have been described in considerable detail for the purpose of disclosing practical, operative structures whereby the invention may be practiced advantageously. The designs described are intended to be illustrative only. The novel characteristics of the invention may be incorporated in other structural forms without departing from the scope of the invention as defined in the following claims.

We claim:

1. An apparatus for inductively sealing an innerseal over an opening in a container, comprising:

a power supply for producing alternating current;

a cabinet for containing the power supply, comprising a cover and a baseplate heat sink sealed together so that the cabinet can be spray washed, wherein heat producing elements in the power supply are in thermal contact with the baseplate heat sink;

an external sealing head mounted to the cabinet and containing a coil which is electrically connected to the power supply and is operable to produce an electromagnetic field for heating at least one innerseal disposed proximate the sealing head over the opening in at least one container so as to heat the innerseal and hermetically seal the innerseal to the container; and an external fan disposed between the sealing head and the cabinet for cooling the sealing head and the power supply.

2. The apparatus as recited in claim 1, further comprising a second external fan disposed between said cabinet and said sealing head for cooling at least one of said power supply and said sealing head.

3. The apparatus as recited in claim 2, wherein said fans move air in opposing directions.

4. The apparatus as recited in claim 1, further comprising a sealing head mounting bracket extending downwardly from said cabinet, said sealing head being removably secured to said sealing head mounting bracket.

5. The apparatus as recited in claim 4, wherein said sealing head mounting bracket is sized to interchangeably mount sealing heads having different sealing side configurations.

6. The apparatus as recited in claim 5, wherein the housing further comprises an electromagnetic field focusing element directing the electromagnetic field toward said sealing side.

7. The apparatus as recited in claim 6, wherein said electromagnetic field focusing element is made of a ferromagnetic compound.

8. The apparatus as recited in claim 1, further comprising a housing which encloses said coil and has a heat sink in thermal contact with said coil and located adjacent to said fan.

9. The apparatus as recited in claim 8, wherein said housing has a sealing side forming a longitudinal channel which is directed downward to receive and partially surround the openings in the containers which are beneath said sealing head and said coil is longitudinally wound around the channel.

10. The apparatus as recited in claim 8, wherein said housing has a substantially flat sealing side and said wire coil is transversely wound.

11. The apparatus as recited in claim 1, further comprising a cabinet mounting bracket for mounting said cabinet to a support post.

12. The apparatus as recited in claim 11, wherein said cabinet mounting bracket is mounted to said support post so that the height of said cabinet can be adjusted.

13. The apparatus as recited in claim 12, wherein said support post includes a track on which said cabinet mounting bracket may slide to adjust the height of said cabinet.

14. An apparatus for inductively sealing an innerseal over an opening in a container, comprising:

a cabinet having a cover and a base for containing a power supply producing alternating current;

an external sealing head containing at least one coil producing an electromagnetic field for heating at least one innerseal disposed proximate said sealing head over the opening in at least one container so as to heat said innerseal and hermetically seal said innerseal to said container; and at least one shielded connector assembly having a terminal half and a receptor half, wherein one of said halves is attached to said power supply cabinet base and said other half is attached to said sealing head, said terminal and receptor halves being removably engaged so as to electrically connect said at least one sealing head coil to said power supply;

wherein said base is a heat sink, said heat sink being in thermal contact with heat producing elements of said power supply;

wherein said sealing head includes a top plate heat sink and further comprising at least one external fan disposed between said cabinet base and said sealing head top plate for cooling said sealing head and said power supply.

15. The apparatus as recited in claim 14, wherein said terminal half of said at least one shielded connector assembly comprises an electrically conductive terminal post extending along a connector axis and surrounded by a concentric elongated annular terminal shroud, and said receptor half of said at least one shielded connector assembly comprises an electrically conductive terminal receptor extending along said connector axis and surrounded by a concentric annular receptor shroud, said terminal post being sized to fit within and contact said terminal receptor so as to electrically connect said at least one sealing head coil to said power supply.

16. The apparatus as recited in claim 15, wherein said terminal post is in surface contact with said terminal receptor.

17. The apparatus as recited in claim 15, wherein said terminal shroud is sized to fit within said receptor shroud.

18. The apparatus as recited in claim 15, wherein said receptor shroud is sized to fit within said terminal shroud.

19. The apparatus as recited in claim 15, further comprising a sealing ring fixed proximate an open edge of one of said terminal and receptor shrouds so as to hermetically seal off said terminal receptor and post.

20. The apparatus as recited in claim 15, wherein the engagement of said terminal and receptor halves is adjustable along the height of said terminal post.

21. The apparatus as recited in claim 15, wherein opposite an engaging end said terminal post has an external threaded portion disposed within an aperture in said terminal shroud concentric with said connector axis.

22. The apparatus as recited in claim 21, wherein said base has an internal threaded aperture sized to receive a threaded stud opposite a coupling end of said terminal shroud for mounting said terminal half to said cabinet.

23. The apparatus as recited in claim 15, wherein opposite an engaging end said terminal receptor has an external threaded portion disposed within an aperture in said receptor shroud concentric with said connector axis.

24. The apparatus as recited in claim 23, wherein said sealing head has an internal threaded aperture sized to receive a threaded stud opposite a coupling end of said terminal receptor for mounting said receptor half to said sealing head.

25. The apparatus as recited in claim 15, wherein said terminal post has a power supply electrical connection point at a non-coupling end and said terminal receptor has a coil electrical connection point at a non-coupling end.

26. The apparatus as recited in claim 14, having three shielded connector assemblies such that electrical engagement of a pair of connector assemblies drives said at least one coil at a desired frequency.

27. The apparatus as recited in claim 14, wherein said cabinet, said sealing head and said at least one shielded connector assembly can be spray washed.

* * * * *